(12) United States Patent
Nagarkar (10) Patent No.: US 11,032,183 B2
(45) Date of Patent: Jun. 8, 2021

(54) ROUTING INFORMATION VALIDATION IN SDN ENVIRONMENTS

(71) Applicant: NICIRA, INC., Palo Alto, CA (US)

(72) Inventor: Amardeep Nagarkar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 86 days.

(21) Appl. No.: 15/817,315

(22) Filed: Nov. 20, 2017

(65) Prior Publication Data

US 2019/0109780 A1 Apr. 11, 2019

(30) Foreign Application Priority Data

Oct. 6, 2017 (IN) .............................. 201741035454

(51) Int. Cl.
*H04L 12/751* (2013.01)
*H04L 12/713* (2013.01)
*H04L 12/707* (2013.01)

(52) U.S. Cl.
CPC .............. *H04L 45/02* (2013.01); *H04L 45/22* (2013.01); *H04L 45/586* (2013.01)

(58) Field of Classification Search
CPC ....... H04L 45/02; H04L 45/22; H04L 45/586; H04L 12/751
See application file for complete search history.

(56) References Cited

U.S. PATENT DOCUMENTS

| 8,521,904 B1 * | 8/2013 | Pei ......................... H04L 45/02 709/238 |
| 2010/0153537 A1 * | 6/2010 | Wang ..................... H04L 63/14 709/224 |
| 2010/0284403 A1 * | 11/2010 | Scudder ................. H04L 45/04 370/392 |

(Continued)

OTHER PUBLICATIONS

S. Seto, N. Tateishi, M. Nishio and H. Seshake, "Detecting and recovering prefix hijacking using multi-agent inter-AS diagnostic system," 2010 IEEE Network Operations and Management Symposium—NOMS 2010, Osaka, 2010, pp. 882-885, doi: 10.1109/NOMS.2010.5488348. (Year: 2010).*

(Continued)

*Primary Examiner* — Thinh D Tran
(74) *Attorney, Agent, or Firm* — Su IP Consulting (57) ABSTRACT

Example methods are provided for a computer system to validate routing information in a software-defined networking (SDN) environment. The method may comprise obtaining routing information associated with a logical router in a first autonomous system and network topology information associated with the first autonomous system. The routing information may specify multiple first routes to respective multiple first networks, and the network topology information may specify multiple second routes that connect the logical router to respective multiple second networks. The method may also comprise validating the routing information based on the network topology information to determine whether the multiple first routes are valid based on the (Continued)

multiple second routes; and in response to determination that a particular first route from the multiple first routes is invalid, configuring the logical router to exclude the particular first route from route advertisement information destined for a second autonomous system.

24 Claims, 8 Drawing Sheets

(56) References Cited

U.S. PATENT DOCUMENTS

| | | | |
|---|---|---|---|
| 2011/0153801 A1* | 6/2011 | Ji | H04L 63/1416 709/224 |
| 2015/0263946 A1* | 9/2015 | Tubaltsev | H04L 45/586 370/392 |
| 2017/0034039 A1* | 2/2017 | Yadlapalli | H04L 45/02 |
| 2017/0207963 A1* | 7/2017 | Mehta | H04L 41/0896 |
| 2018/0131604 A1* | 5/2018 | Zhou | H04L 45/02 |

OTHER PUBLICATIONS

Benton, Kevin & Camp, L. & Swany, Martin. (2016). Bongo: A BGP speaker built for defending against bad routes. 735-739. 10.1109/MILCOM.2016.7795416. (Year: 2016).*

* cited by examiner

External routing information 710

| route.network | route.nextHop | route.(locPrf, weight,MED,asPath) | |
|---|---|---|---|
| 50.1.0.0/16 | 200.0.0.1 | (0, 0 0, 2) | ~711 |
| 60.1.0.0/16 | 200.0.0.1 | (0, 0, 0, [2, 3]) | ~712 |
| 70.1.0.0/16 | 200.0.0.1 | (0, 0, 0, [2, 4]) | ~713 |

Stored external routing information (working table) 720

| route.network | route.nextHop | route.(locPrf, weight,MED,asPath) | |
|---|---|---|---|
| 50.1.0.0/16 | 200.0.0.1 | (0, 0 0, 2) | ~721 |
| 60.1.0.0/16 | 200.0.0.1 | (0, 0, 0, [2, 3]) | ~722 |
| 70.1.0.0/16 | 200.0.0.1 | (0, 0, 0, [2, 4]) | ~723 |

Updated external routing information 730

| route.network | route.nextHop | route.(locPrf, weight,MED,asPath) | |
|---|---|---|---|
| 50.1.0.0/16 | 200.0.0.1 | (0, 0 0, 2) | ~731 |
| 60.1.0.0/16 | 200.0.0.1 | (0, 0, 0, [2, 3]) | ~732 |
| 70.1.0.0/16 | 310.0.0.1 | (0, 0, 0, [2, 4]) | ~733 |

ROUTING INFORMATION VALIDATION IN SDN ENVIRONMENTS

RELATED APPLICATIONS

Benefit is claimed under 35 U.S.C. 119(a)-(d) to Foreign Application Serial No. 201741035454 filed in India entitled "ROUTING INFORMATION VALIDATION IN SDN ENVIRONMENTS", on Oct. 6, 2017, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be configured. Similar to a physical network, logical switches and logical routers may to provide respective layer-2 switching and layer-3 routing services to virtualized computing instances. In practice, a logical router may exchange routing information with an external router to facilitate traffic forwarding to and from the virtualized computing instances. Such routing information exchange relies on a trust relationship between routers. However, the routing information may be invalid or bogus, which is undesirable.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
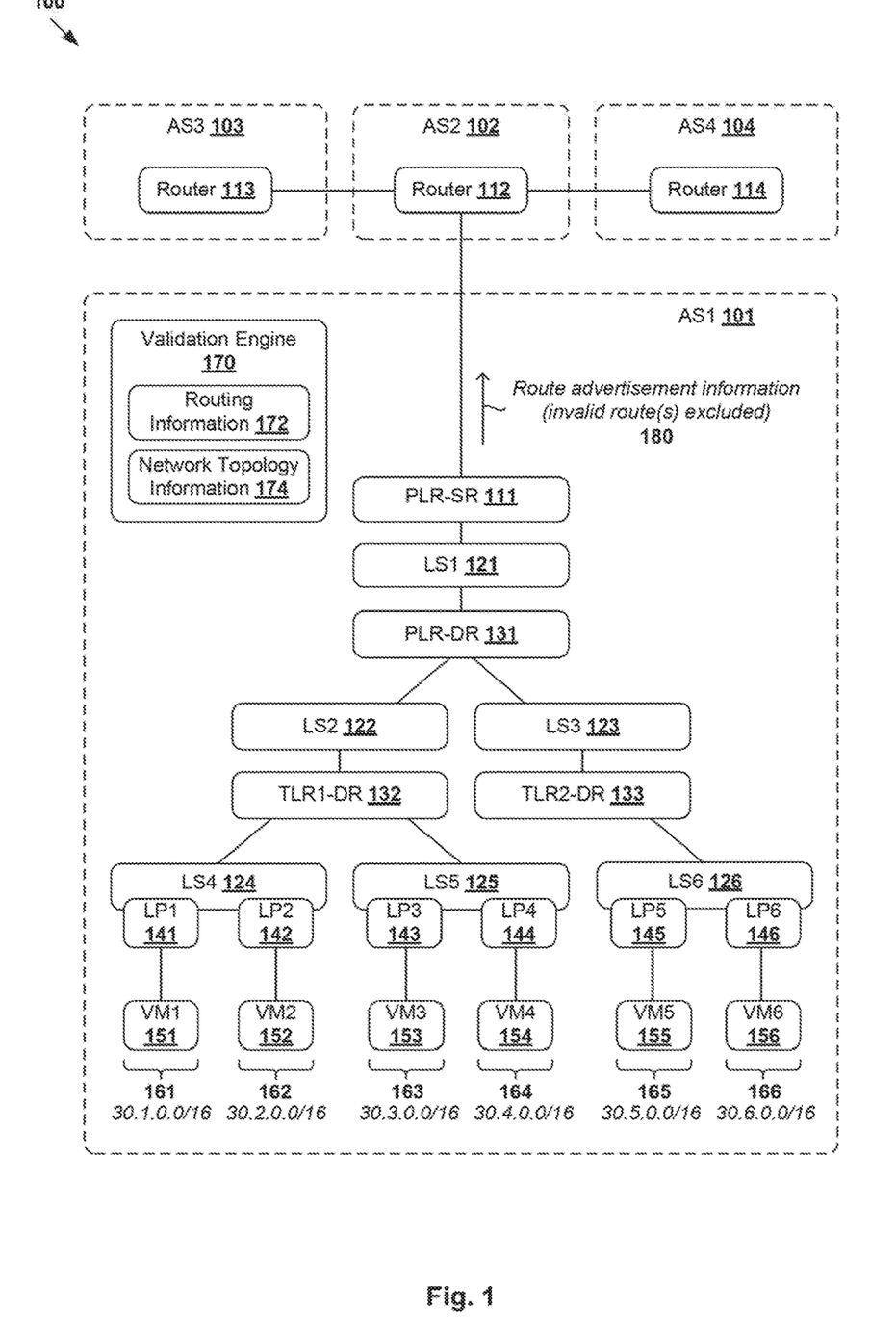
FIG. 1 is a schematic diagram illustrating a management plane view of an example SDN environment in which routing information validation may be performed.
Figure 2:
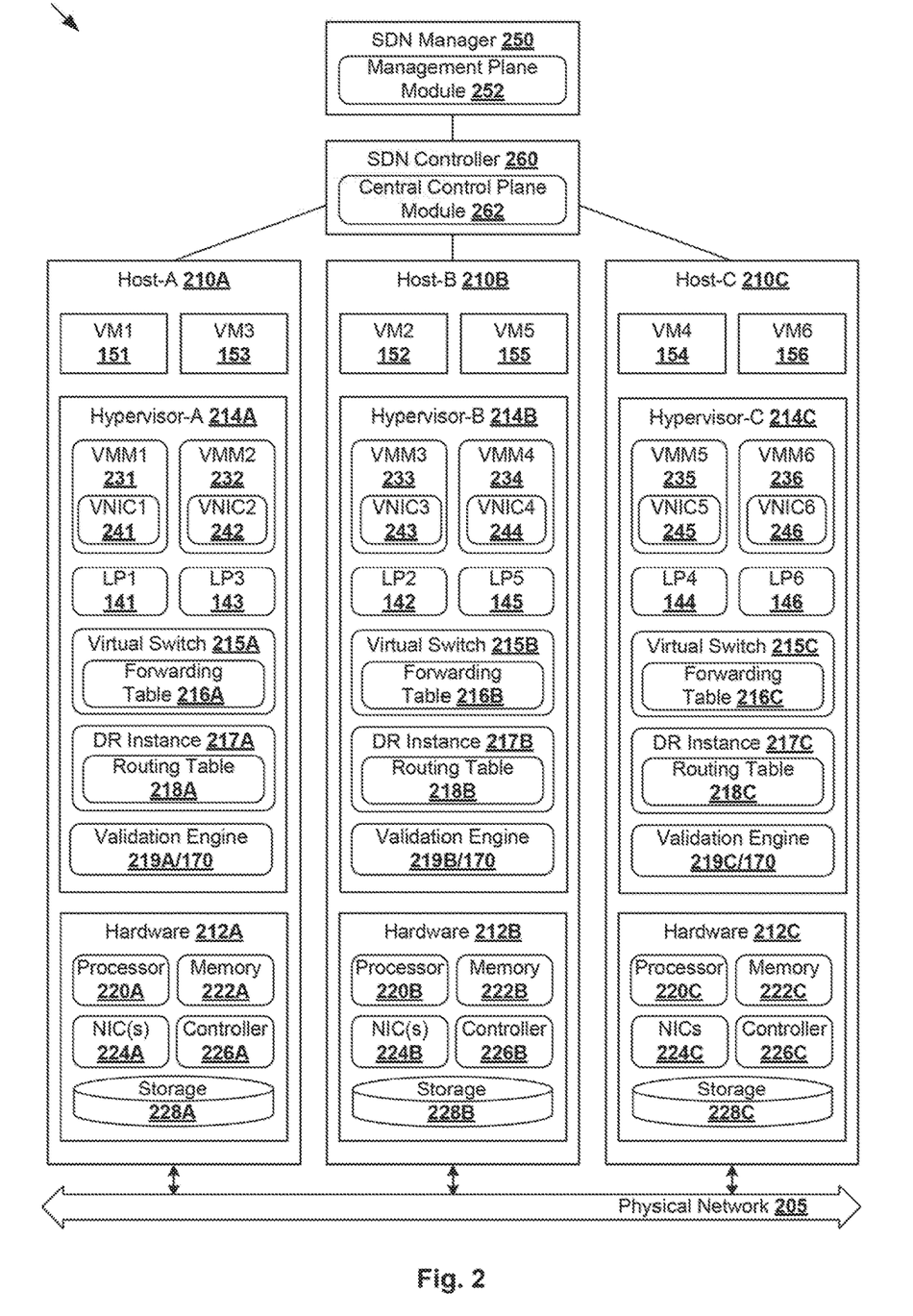
FIG. 2 is a schematic diagram illustrating a physical implementation view of the example SDN environment in FIG. 1.

Challenges relating to routing information exchange will now be explained in more detail using FIG. 1 and FIG. 2, which represent two different views of the same software-defined networking (SDN) environment 100. FIG. 1 is a schematic diagram illustrating a management plane view of example SDN environment 100 in which routing information validation may be performed, and FIG. 2 is a schematic diagram illustrating physical implementation view 200 of example logical SDN environment 100 in FIG. 1. Depending on the desired implementation, SDN environment 100 may include additional and/or alternative component(s) than that shown in FIG. 1 and FIG. 2.

As will be explained further below, the management plane view in FIG. 1 represents how various components are defined internally, whereas the physical implementation view in FIG. 2 represents a physical realization of those components. In SDN environment 100, a "logical router" may be a logical distributed router (DR) or logical service router (SR). A DR represents a distributed routing component that is deployed to provide routing services for virtualized computing instances (e.g., virtual machines (VMs)) and implemented in a distributed manner in that it may span multiple hosts that support those virtualized computing instances. An SR represents a centralized routing component that is deployed to provide centralized stateful services, such as firewall protection, load balancing, network address translation (NAT), etc.

In a data center with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier but only DRs at the lower tier. The multi-tiered topology enables both the provider (e.g., data center owner) and tenant (e.g., data center tenant) to control their own services and policies. Each tenant has full control over its TLR policies, whereas common PLR policies may be applied to different tenants. As such, a logical router may be categorized as one of the following types: TLR-DR, TLR-SR, PLR-DR and PLR-SR.

Turning now to the example in FIG. 1, SDN environment 100 includes PLR-SR (see 111), PLR-DR (see 131) and TLR-DRs (see 131-133). A first set of logical switches 121-123 (known as transit logical switches) are configured to handle communications between two logical routers, and not directly connected to any virtual machine. In the example in FIG. 1, LS1 121 connects PLR-SR 111 with PLR-DR 131, LS2 122 connects TLR1-DR 132 with PLR-DR 131 and LS3 123 connects TLR2-DR 133 with PLR-DR 131. A provider generally has full control over PLR-SR 111 and PLR-DR 131, while each tenant has full control over their own TLR-DR and/or TLR-SR (not shown in FIG. 1 for simplicity). In practice, PLR-SR 111 may be implemented using a cluster of SRs (not shown) for fault tolerance purposes.

TLR1-DR 132 (e.g., associated with a first tenant) and TLR2-DR 133 (e.g., associated with a second tenant) are deployed to provide layer-3 routing services for respective VMs 151-156. A second set of logical switches 124-126 provide first-hop, layer-2 switching services to VMs 151-156 connected to respective logical ports 141-146. TLR1-DR 132 is connected with VM1 151 and VM2 152 via LS4 124, and with VM3 153 and VM4 154 via LS5 125. TLR2-DR 133 is connected with VM5 155 and VM6 156 via LS6 126. The term "layer-2" may refer generally to a Media Access Control (MAC) layer; and "layer-3" to a network or Internet Protocol (IP) layer in the Open System Interconnection (OSI) model, although the concepts described herein may be used with other networking models.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. Example containers will be discussed further using FIG. 8. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Referring to physical implementation view 200 in FIG. 2, multiple hosts 210A-220C (also known as a "computing devices", "host computers", "host devices", "physical servers", "server systems", "physical machines" etc.) may be used to physically realize SR 111, DRs 131-133, logical switches 121-126, logical ports (LPs) 141-146 and VMs 151-156 in FIG. 1. For example, host-A 210A supports VM1 151 and VM3 153, host-B 210B supports VM2 152 and VM5 155, and host-C 210C supports VM4 154 and VM6 156. Although not shown in FIG. 2, PLR-SR 111 may be implemented by a virtual machine, such as on an edge node. In practice, any other suitable approach may be used to implement PLR-SR 111, such as Linux-based datapath development kit (DPDK) packet processing software, etc.

Hypervisor 214A/214B/214C maintains a mapping between underlying hardware 212A/212B/212C and virtual resources allocated to respective VMs. Hardware 212A/212B/212C includes suitable physical components, such as processor(s) 220A/220B/220C; memory 222A/222B/222C; physical network interface controller(s) or NIC(s) 224A/224B/224C; and storage disk(s) 228A/228B/228C accessible via storage controller(s) 226A/226B/226C, etc. Virtual resources are allocated to each virtual machine to support a guest operating system (OS) and applications. Corresponding to hardware 212A/212B/212C, the virtual resources may include virtual CPU, virtual memory, virtual disk, virtual network interface controller (VNIC), etc. Hardware resources may be emulated using virtual machine monitors (VMMs) 231-236, which may be considered as part of corresponding VMs 151-156, or alternatively, separated from VMs 151-156. For example in FIG. 2, VNICs 241-246 are emulated by corresponding VMMs 231-236.

Hypervisors 214A-C further implement respective virtual switches 215A-C and DR instance 217A-C to handle egress packets from, and ingress packets to, VMs 151-156. In practice, logical switches and logical distributed routers may be implemented in a distributed manner and can span multiple hosts 210A-C. For example, logical switches 121-126 in FIG. 1 may be implemented collectively by virtual switches 215A-C of respective hosts 210A-C and represented internally using forwarding tables 216A-C at the respective virtual switches 215A-C. Forwarding tables 216A-C may be each include entries that collectively implement LS1 121, LS2 122, LS3 123, LS4 124, LS5 125 and LS6 126. Further, DRs 131-133 may be implemented collectively by DR instances 217A-C of respective hosts 210A-C and represented internally using routing tables 218A-C. Routing tables 218A-C may be each include entries that collectively implement PLR-DR 131, TLR1-DR 132 and TLR2-DR 133.

VMs 151-156 send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches 215A-C of hosts 210A-C, whereas a "virtual switch" may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Further in FIG. 2, SDN manager 250 and SDN controller 260 are example network management entities that facilitate implementation of software-defined (e.g., logical overlay) networks. One example of an SDN controller is the NSX controller component of VMware NSX® (available from VMware, Inc.) that operates on a central control plane. SDN controller 260 may be a member of a controller cluster (not shown for simplicity) that is configurable using SDN manager 250 operating on a management plane. Network management entity 250/260 may be implemented using physical machine(s), virtual machine(s), or both.

Logical switches, logical routers, and logical overlay networks may be configured using SDN manager 250, SDN controller 260, etc. A logical overlay network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 151 and VM2 152 connected to LS4 124 may be located on the same logical layer-2 segment (e.g., VXLAN5001). Hosts 210A-C may maintain data-plane connectivity with each other via physical network 205 to facilitate communication among VMs 151-156.

Referring to FIG. 1 again, SDN environment 100 may include multiple independently-administered Autonomous Systems (ASs), such as AS1 101, AS2 102, AS3 103 and AS4 104. To facilitate communication between endpoints (e.g., source VM1 151 in AS1 101 and a destination in AS4 104), an inter-domain routing protocol (also known as gateway protocol) may be used by routers 111-114 to maintain and exchange routing information between ASs. Any suitable protocol may be used, such as Border Gateway Protocol (BGP), Open Shortest Path First (OSPF), Intermediate System to Intermediate System (IS-IS), etc.

In practice, however, protocols such as BGP are designed based on the implicit trust among all participating routers and do not provide any security guarantee. For example, one AS may send route advertisements to announce routes to other ASs without any measures to validate the routes being propagated. In some cases, the route advertisements may contain invalid or bogus routes, which may expose SDN environment 100 to widespread damages and service outages. One example occurred in 2008 when Pakistan Telekommunications propagated bogus routes across the world. Bogus routes may also be injected by a third party, such as during prefix hijacking by spammers. These security problems are undesirable in SDN environment 100.

Routing Information Validation

According to examples of the present disclosure, security may be improved in SDN environment 100 by validating routing information associated with a logical router (e.g., PLR-SR 111) based on network topology information associated with an AS (e.g., AS1 101). This way, routes specified by the routing information may be validated to avoid, or reduce the likelihood, of the logical router in a first autonomous system (e.g., PLR-SR 111 in AS1 101) propagating invalid routes to a second autonomous system (e.g., router 112 in AS2 102).

Figure 3:
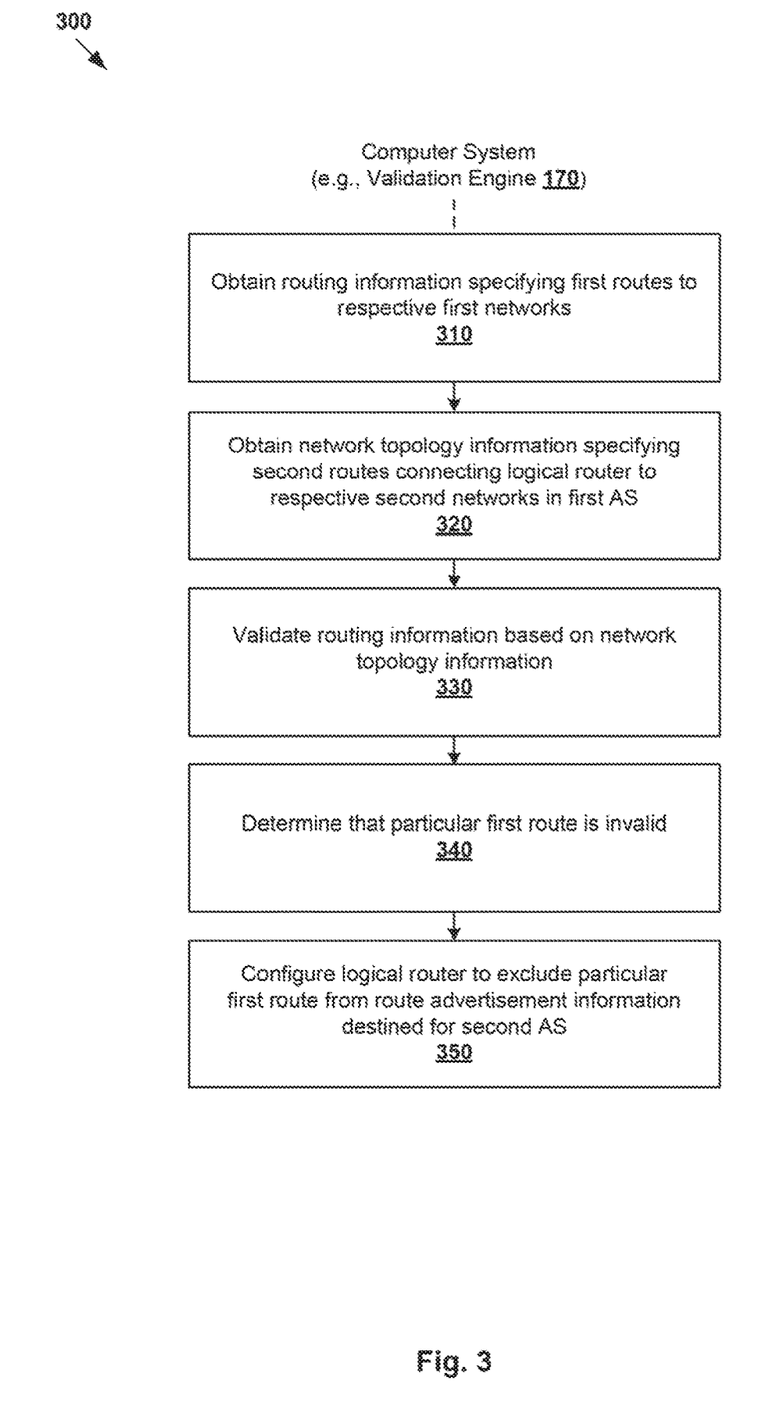
FIG. 3 is a flowchart of a first example process for a computer system to perform routing information validation in an SDN environment.

In more detail, FIG. 3 is a flowchart of example process 300 for a computer system to perform routing information validation in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. In practice, examples of the present disclosure may be implemented using any suitable "computer system" supporting validation engine 170, which may be implemented by the same computer system(s) supporting SDN manager 250 (e.g., using management plane module 252), SDN controller 260 (e.g., using central control plane module 262), hosts 210A-C (e.g., using local validation engines 219A-C), any combination thereof.

At 310 in FIG. 3, routing information (see 172 in FIG. 1) associated with a logical router (e.g., PLR-SR 111) is obtained. As will be described further using FIG. 4 and FIG. 5, routing information 172 may specify multiple first routes to respective multiple first networks. As used herein, the term "obtain" may refer generally to retrieving or receiving the information from any suitable storage or source (e.g., SDN controller 260, SDN manager 270, hosts 210A-C implementing the logical router), etc.

At 320 in FIG. 3, network topology information (see 174 in FIG. 1) associated with AS1 101 is obtained. As will be described further using FIG. 4 and FIG. 5, network topology information 174 may specify multiple second routes that connect the logical router to respective multiple second networks in which multiple virtualized computing instances (e.g., VMs 151-156) are located within the first autonomous system. In practice, the "first routes" may represent routes specified in the routing information, and the "second routes" expected routes that may be used to validate the first routes.

At 330 in FIG. 3, routing information 172 is validated based on network topology information 174 by determining whether the first routes are valid based on the second routes. In one example, the validation at block 330 may involve determining whether a particular first network matches with one of the multiple second networks specified by the network topology information. In another example, the validation at block 330 may involve determining whether the particular first route is valid based on one or more of the following attributes associated with the particular first route: a next hop connecting the logical router to the particular first network, local preference information, weight information, multi exit discriminator (MED) information and autonomous system (AS) path information.

In the example in FIG. 1, network topology information 174 may specify routes that connect PLR-SR1 111 to respective networks 30.1.0.0/16 in which VM1 151 is located (see 161), 30.2.0.0/16 in which VM2 152 is located (see 162), 30.3.0.0/16 in which VM3 153 is located (see 163), 30.4.0.0/16 in which VM4 154 is located (see 164), 30.5.0.0/16 in which VM5 155 in located (see 165) and 30.6.0.0/16 in which VM6 156 is located (see 166). If routing information 172 specifies a particular route to a particular network (e.g., 30.7.0.0/16) that does not match with any of the routes specified by network topology information 174, that particular route may be determined to be invalid. In practice, network topology information 174 may be stored in any suitable data structure, such as a graph data structure that may be traversed during routing information validation.

At 340 and 350, in response to determination that a particular first route is invalid, the logical router is configured to exclude the particular first route from route advertisement information (see 180 in FIG. 1) destined for a second autonomous system (e.g., AS2 102). The configuration at block 350 may involve validation engine 170 generating and sending a notification message to the logical router to cause the logical router to exclude the particular first route from route advertisement information destined for external router 112 in AS2 102.

According to examples of the present disclosure, routing information may be validated using network topology information, which may be generated or collected based on existing information available to a cloud center tenant, SDN manager 250, SDN controller 260, any combination thereof. This should be contrasted against conventional approaches that rely on information from an external source, such as routing registry systems that store global information relating to valid routes and AS path information. Such routing registry systems may be susceptible to malicious attacks and therefore not always be reliable. Examples of the present disclosure should be contrasted against conventional approaches that rely on cryptographic techniques (e.g., using cryptographic pairwise keying, public key cryptography, certificates, etc.). Examples of the present disclosure do not necessitate any changes to the routing protocol (e.g., BGP) used by routers 111-114.

Further, as will be discussed using FIG. 6 and FIG. 7, external routing information may be validated according to examples of the present disclosure. This may involve obtaining external routing information received by a logical router (e.g., PLR-SR 111 in AS1 101) from an external router (e.g., 112 in AS2 102). The external routing information may specify multiple third routes connecting the logical router to respective multiple third networks outside of AS1 101. In response to determination that a particular third route from the multiple third networks is valid at a first instance of time, the particular third route to a particular third network is stored. In response to determination that an updated route to the particular third network is invalid at a second instance of time, the updated route is replaced with the stored third route to reach the third network. In the following, various examples will be discussed using FIG. 4 to FIG. 8.

Network Topology Information

Figure 4:
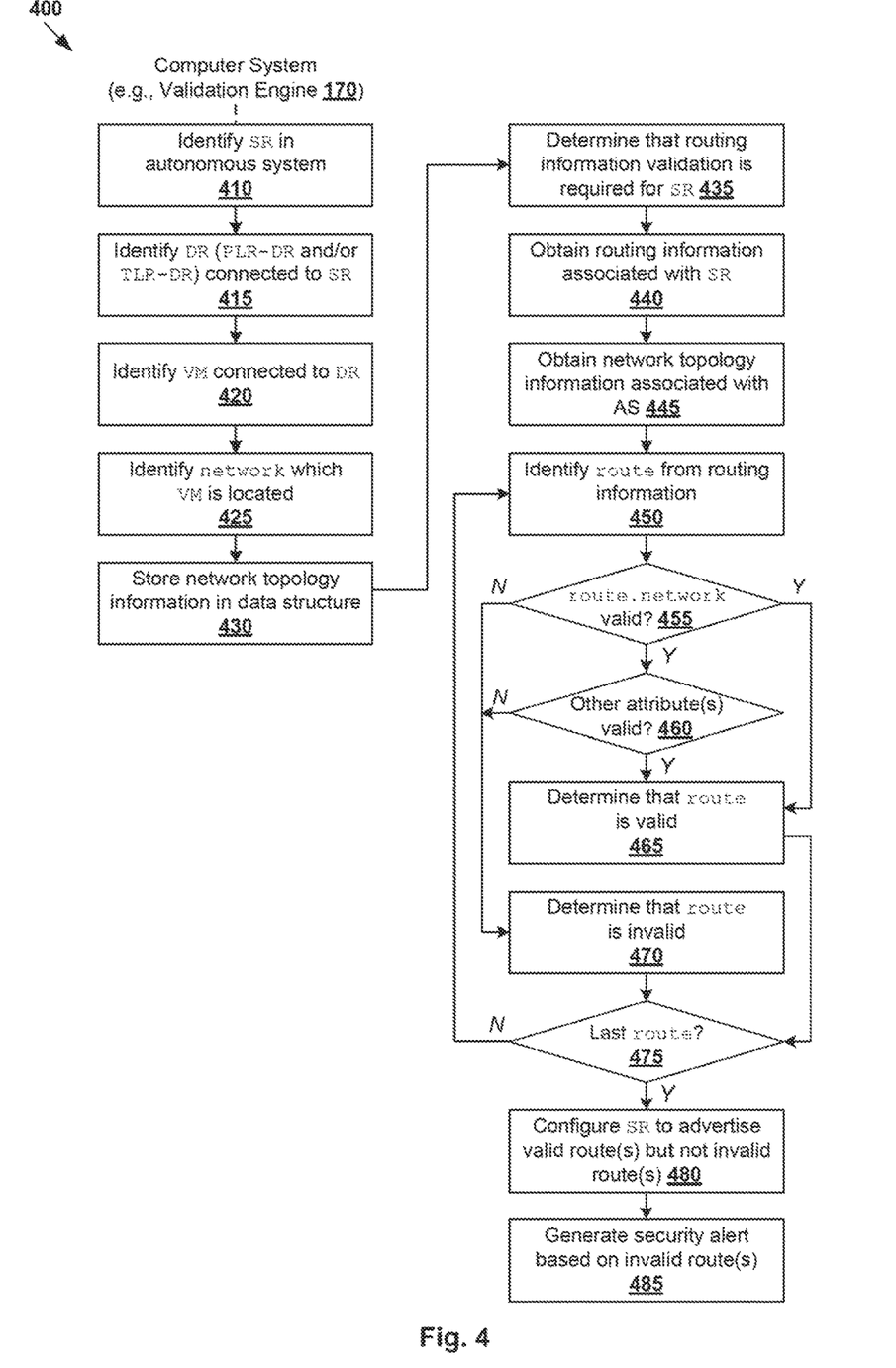
FIG. 4 is a flowchart of an example detailed process for a computer system to perform routing information validation in an SDN environment according to the example in FIG. 3.

FIG. 4 is a flowchart of example detailed process 400 for a computer system to perform routing information validation in SDN environment 100. Example process 400 may include one or more operations, functions, or actions illustrated at 410 to 485. The various operations, functions or actions may be combined into fewer blocks, divided into additional blocks, and/or eliminated depending on the desired implementation. FIG. 4 will be explained using FIG. 5, which is a schematic diagram illustrating example network topology information 174/510 and example routing information 172/520 in SDN environment 100.

At 410 to 425 in FIG. 4, validation engine 170 generates network topology information 510 specifying how an SR is connected to various networks in a particular AS. This may involve validation engine 170 identifying a particular SR in the AS (see 410), each DR connected to the SR (see 415), each virtualized computing instance connected to a particular DR (see 420) and each network in which virtualized computing instance(s) are located (see 425).

Figure 5:
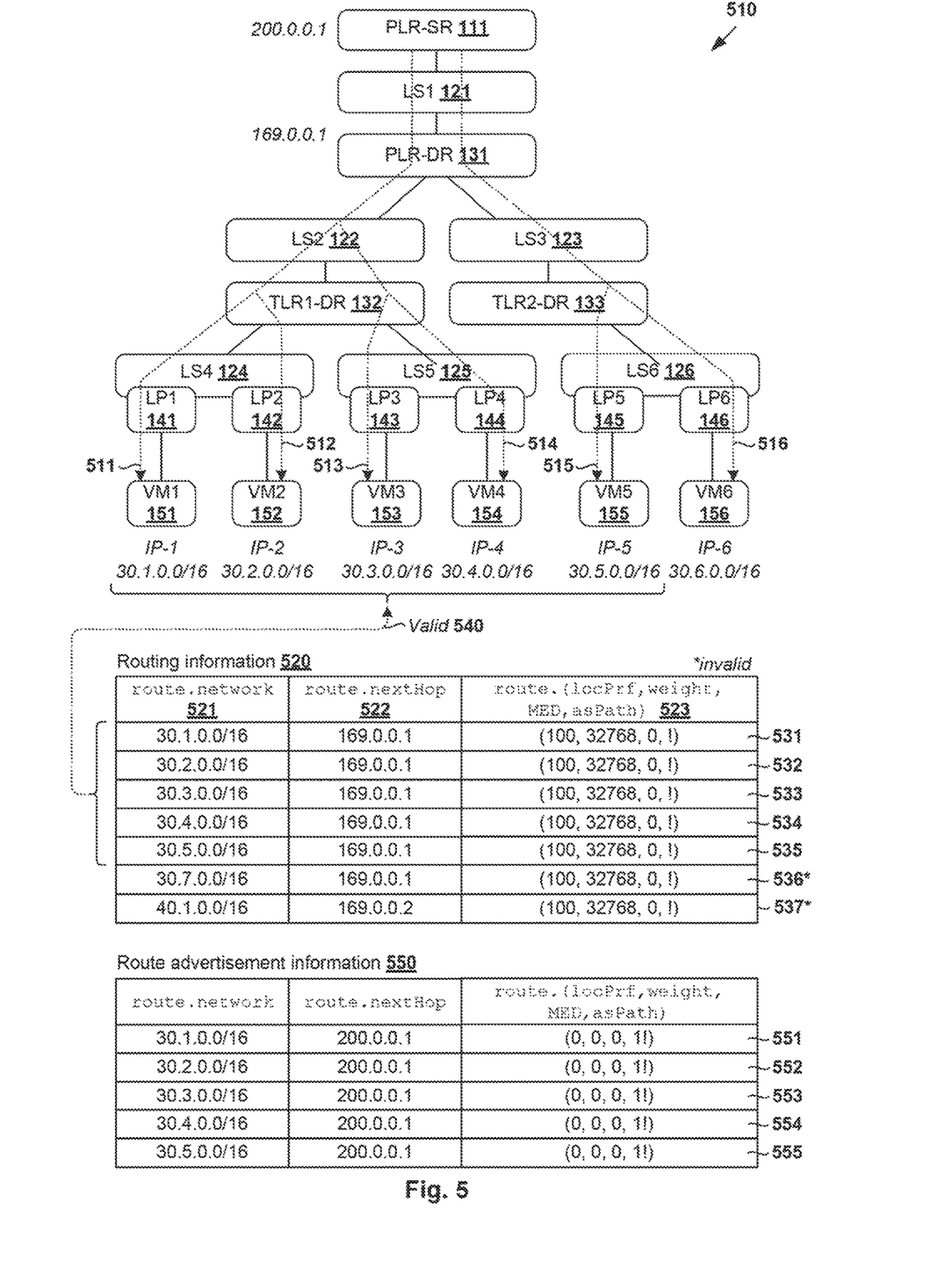
FIG. 5 is a schematic diagram illustrating example network topology information and example routing information in an SDN environment.

In the example in FIG. 5, network topology information 510 specifies that PLR-SR 111 in AS1 101 is connected to PLR-DR 131, TLR1-DR 132 and TLR2-DR 133 via transit logical switches LS1 121, LS2 122 and LS3 123. TLR1-DR 132 is further connected to VM1 151 and VM2 152 via LS4 124, and VM3 153 and VM4 154 via LS5 125. TLR2-DR 133 is further connected to VM5 155 and VM6 156 via LS6 126. VM1 151 is associated with IP address IP-1=30.1.0.1, VM2 152 with IP-2=30.2.0.1, VM3 153 with IP-3=30.3.0.1, VM4 154 with IP-4=30.4.0.1, VM5 155 with IP-5=30.5.0.1 and VM6 156 with IP-6=30.6.0.1. As such, through DRs 131-133 and logical switches 121-126, PLR-SR 111 is connected to networks 30.1.0.0/16, 30.2.0.0/16, 30.3.0.0/16, 30.4.0.0/16, 30.5.0.0/16 and 30.6.0.0/16.

At 430 in FIG. 4, network topology information 510 is stored in any suitable storage accessible by validation engine 170. Network topology information 510 may be stored in any suitable data structure, such as a graph data structure (e.g., connected state graph (CSG)), etc. In the example in FIG. 5, network topology information 510 specifies multiple routes 511-516 that connect PLR-SR 111 to respective networks 30.1.0.0/16 (see 511), 30.2.0.0/16 (see 512), 30.3.0.0/16 (see 513), 30.4.0.0/16 (see 514), 30.5.0.0/16 (see 515) and 30.6.0.0/16 (see 516). For example, route 511 from PLR-SR 111 to VM1 151 connects PLR-SR 111, LS1 121, PLR-DR 131, LS2 122, TLR1-DR 132, LS4 124, LP1 141 and VM1 151. Once generated, the data structure (e.g., graph) may be accessed using an Application Programming Interface (API), such as graph.create( ) for PUT/GET calls, graph.update( ), for POST calls etc. The graph may be serializable and able to maintain dependencies.

The data structure may be in any suitable format may be used, such as JavaScript Object Notation (JSON), eXtensible Markup Language (XML), etc. For example, in relation to a logical router (e.g., PLR-DR 131, TLR1-DR 132 and TLR2-DR 133), the logical router may be associated with any suitable attribute(s), such as identifier, type (e.g., SR or DR), tier (e.g., PLR or TLR), uplink(s), BGP enabled (e.g., true or false for SR), etc. The identifier of each logical router may be a universally unique identifier (UUID) or a globally unique identifier (GUID) to ensure unambiguous identification. Depending on the desired implementation, generating network topology information 510 may involve generating an SR-DR map that specifies how PLR-SR 111 is connected to PLR-DR 131, TLR1-DR 132 and TLR2-DR 133.

Routing Information

At 435 and 440 in FIG. 4, in response to determination that validation is required, validation engine 170 obtains routing information 520 associated with PLR-SR 111 and network topology information 510 associated with AS1 101 in which PLR-SR 111 is located. In practice, the determination at block 435 may be performed at any suitable time, such as before PLR-SR 111 generates and sends route advertisement information to external router 112 in AS2 102.

In the example in FIG. 5, routing information 520 specifies multiple routes 531-537. Using BGP as an example, routes 531-537 may be referred to as BGP routes, BGP routing configuration objects, etc. Each route may be associated with a prefix or network (see "route.network" 521) and next hop (see "route.nextHop" 522). For example, PLR-SR 111 may reach networks 30.1.0.0/16 (see 531), 30.2.0.0/16 (see 532), 30.3.0.0/16 (see 533), 30.4.0.0/16 (see 534), 30.5.0.0/16 (see 535) and 30.7.0.0/16 (see 536) via next hop=169.0.0.1. Further, PLR-SR 111 may reach network 40.1.0.0/16 (see 537) via next hop=169.0.0.2. Each network may represent an address block defined in terms of an IP address and a mask, called a Classless Inter-Domain Routing (CIDR) block. For example, 30.1.0.0/16 refers to a block of IP addresses having the same prefix for the first 16 bits.

Each route in routing information 520 may also be associated with any other parameters or attributes (see 523), such as local preference information, weight information, MED information and AS path information. In practice, these attributes are generally used for selecting the best route from multiple routes to a particular network. These attributes may be configured during BGP configuration and available from an edge node supporting PLR-SR 111. The configured attributes may be compared against real-time attributes for a particular route to determine their validity in case a malicious party tries to update or modify the attributes from outside the edge configuration service. For simplicity, only one route per network is shown in FIG. 5. Validation engine 170 may obtain routing information 520 from PLR-SR 111, which collects the information from PLR-DR 131, TLR1-DR 132, TLR2-DR 133, or any combination thereof.

At 445 to 470 in FIG. 4, routing information 520 is validated based on network topology information 510. In particular, a comparison between routes 531-537 ("first routes") in routing information 520 and routes 511-516 ("second routes") in network topology information 510 is made to identify any discrepancy or irregularity. At 450, 455 and 460, for each route identified from routing information 520, the validity of the route is assessed by determining whether a matching route may be found in network topology information 510 based on any suitable route attribute(s) 521-523. If yes (i.e., match is found), it is determined that the route is valid (see 465), but otherwise, invalid (see 470). Blocks 450 to 470 are repeated until all routes are examined (see 475).

In the example in FIG. 5, blocks 455-460 may involve traversing a graph data structure storing network topology information 510 to determine whether routes 531-537 are valid. For example, routes 531-535 may be determined to be valid (see 540) because respective networks 30.1.0.0/16, 30.2.0.0/16, 30.3.0.0/16, 30.4.0.0/16 and 30.5.0.0/16 are found in network topology information 510 at block 455. Block 460 or 465 may be performed after block 455. For example, next hop=169.0.0.1 may be determined to be valid because it matches with an IP address of a backplane interface connecting PLR-SR 111 with PLR-DR 131 at block 460.

In contrast, route 536-537 are determined to be invalid because respective networks 30.7.0.0/16 and 40.1.0.0/16 cannot be found in network topology information 510. In relation to route 536, the associated next hop=169.0.0.2 does not match with any backplane interface IP address connecting PLR-SR 111 with PLR-DR 131. Further, network 30.6.0.0/16 is found in network topology information (see 516), but not routing information 520. This represents a Denial of Service (DoS) attack where there is a valid route to 30.6.0.0/16 (i.e., reachable and connected) but the valid route is removed from the routing information at PLR-DR 131 and PLR-SR 111. Depending on the desired implementation, the validity of 531-535 may be determined based on other attributes 523 (e.g., local preference information, weight information, MED information and AS path information, as discussed above) at block 460.

At 480 in FIG. 4, validation engine 170 configures PLR-SR 111 to advertise valid routes 531-535, but exclude invalid routes 536-537 in route advertisement information 550 destined for external router 112. For example, block 480 may involve generating and sending a notification message to inform PLR-SR 111 that routes 531-535 are valid and routes 536-537 are invalid. If validation engine 170 resides on the same host supporting PLR-SR 111, the notification message may be in the form of an internal message or signal. Otherwise, validation engine 170 may send the notification message via physical network 205, or control-plane channels connecting SDN controller 260 and/or SDN manager 250 with a host supporting PLR-SR 111.

The notification message is to cause PLR-SR 111 to generate and send route advertisement information 550 to external router 112 in AS2 102. Based on valid routes 531-535, route advertisements 551-555 specify next hop=200.0.0.1 (i.e., an IP address associated with PLR-SR 111) for external router 112 to reach networks 30.1.0.0/16 (see 551), 30.2.0.0/16 (see 552), 30.3.0.0/16 (see 553), 30.4.0.0/16 (see 554) and 30.5.0.0/16 (see 555). External router 112 in AS2 102 may in turn advertise these routes (and itself as the next hop) to other routers 113-114 in respective AS3 103 and AS4 104. Route advertisements 551-555 may be sent using any suitable protocol, such as BGP, OSPF, IS-IS, etc. In contrast, since routes 536-537 are invalid, they are not advertised to external router 112. This way, PLR-SR 111 in AS1 101 avoids propagating invalid routing information to AS2 102, AS3 103 and AS4 104.

At 485 in FIG. 4, validation engine 170 generates and sends a security alert associated with invalid routes 536-537. For example, a security alert message may be generated and sent to a user (e.g., network administrator) operating a user computing device via SDN controller 260 and/or SDN manager 270. The security alert message may identify networks 30.7.0.0/16 and 40.1.0.0/16 in routing information 520, and where applicable, describe why they are determined to be invalid based on network topology information 510. In practice, it is possible that invalid routes 536-537 are injected by a third party with malicious intention.

According to examples of the present disclosure, routing information validation may be performed using network topology information 510 that is usually available from a cloud center tenant, the central control plane and/or management plane. In practice, routing information may be validated by invoking validation engine 170 at any time after SDN environment 100 is configured. Validation engine 170 may store routing information specifying routes to various networks, and all endpoints are able to communicate with each other using any suitable routing protocol. The example in FIG. 4 may be repeated for other logical router(s) managed by validation engine 170.

External Routing Information

In the above examples, validation of routing information 520 is performed before PLR-SR 111 in AS1 101 sends route advertisement information 550 to external router 112 in AS2 102. Route advertisement information 550 is sent to advertise, from the perspective of PLR-SR 111, "internal" routes that are located within AS1 101. In practice, external router 112 in AS2 102 also sends route advertisement information to PLR-SR 111 to advertise, from the perspective of PLR-SR 111, "external" routes that are located outside of AS1 101.

However, in practice, route advertisement information from external router 112-114 may contain invalid or bogus routes. This is especially the case when external routers 112-114 are not managed by SDN controller 260 and/or SDN manager 250, and do not perform any routing information validation according to the examples in FIG. 1 to FIG. 5. According to examples of the present disclosure, validation of external routing information, such as bogus route advertisements from external router 112, may be performed. As used herein, the term "external routing information" may refer generally to routing information that is received by PLR-SR 111 from an external router and specifies routes connecting PLR-SR 111 to networks located outside of AS1 101.

Figure 6:
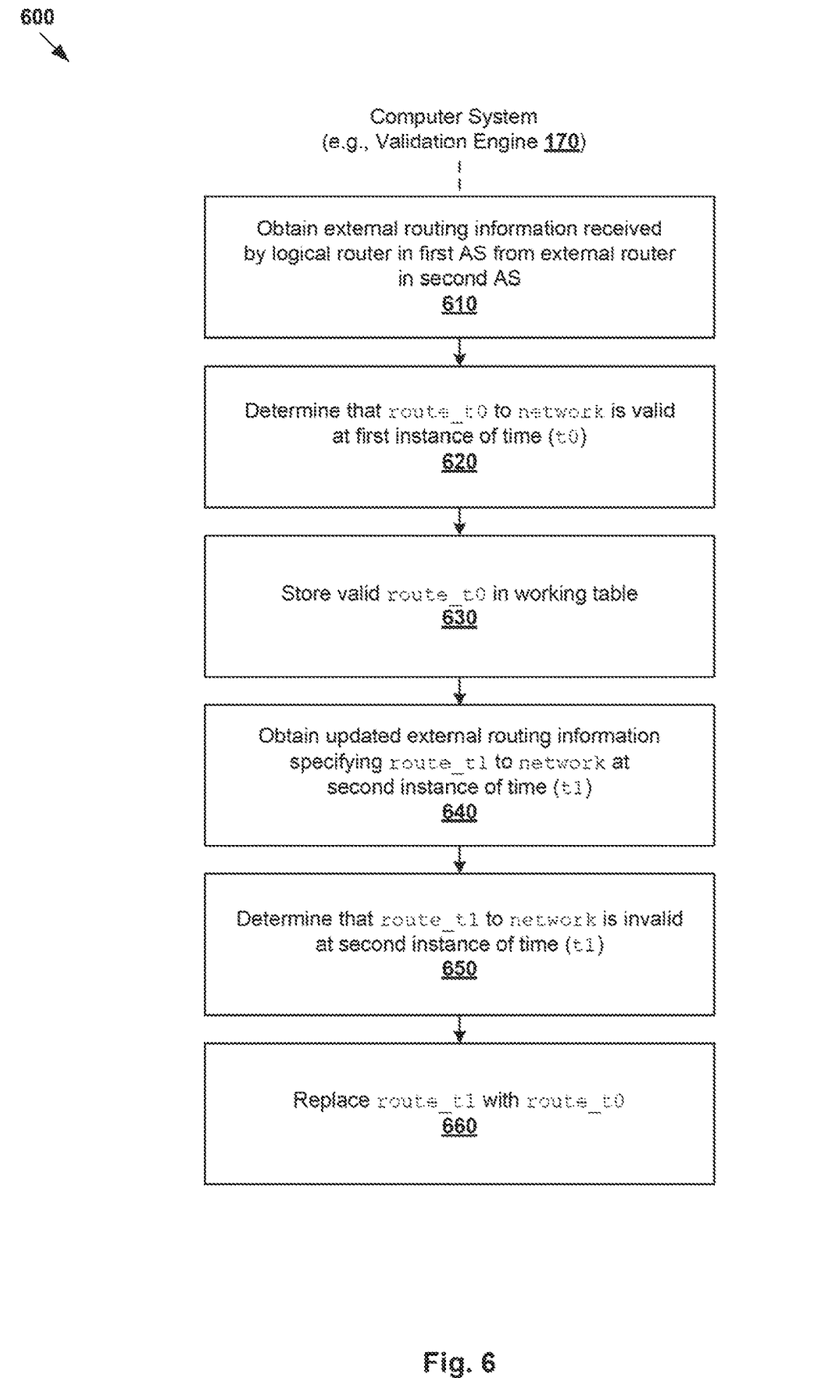
FIG. 6 is a flowchart of an example process for a computer system to perform external routing information validation in an SDN environment.

In more detail, FIG. 6 is a flowchart of example process 600 for a computer system to perform external routing information validation in SDN environment 100. Example process 600 may include one or more operations, functions, or actions illustrated at 610 to 660. The various operations, functions or actions may be combined into fewer blocks, divided into additional blocks, and/or eliminated depending on the desired implementation. The example in FIG. 6 will be discussed using FIG. 7. In particular, FIG. 7 is a schematic diagram illustrating example routing information 710, 720 at different instances of time.

At 610 in FIG. 6, validation engine 170 obtains external routing information 710 received by PLR-SR 111 in AS1 101 from external router 112 in AS2 102. External routing information 710 specifies routes 711-713 connecting PLR-SR 111 with destination networks outside of AS1 101. In the example in FIG. 7, external routing information 710 specifies routes 711-713 to 50.1.0.0/16 in AS2 102 (see 711), 60.1.0.0/16 in AS3 103 (see 712) and 70.1.0.0/16 in AS4 104 (see 713).

The next hop associated with routes 711-713 is 200.0.0.2, which is an IP address of a downlink interface of external router 112 connected with PLR-SR 111. Similar to the examples in FIG. 5, routes 711-713 may be associated with other attributes, such as local preference, weight, MED and AS path. The direction of an AS path is from an observer AS (e.g., AS1 101) to the origin AS. Using route 712 as an example, AS path=[2, 3] indicates that the routing information propagates from AS3 103 (i.e., '3') to AS2 102 (i.e., '2') and now to AS1 101.

At 620 and 630 in FIG. 6, in response to determination that a particular route in external routing information 710 is valid at a first instance of time (denoted as t0), the particular route is stored in working table 720. The determination at block 620 may be performed based on input from a user (e.g., network administrator), such as during network deployment or at any time validation is completed by the user. Additionally or alternatively, the validation may be performed automatically, such as by detecting that the particular route is up and running for a predetermined period of time, etc. This way, valid routes 721-723 may be maintained in routing table 720 for later access.

At 640 in FIG. 6, validation engine 170 obtains updated external routing information 730 received by PLR-SR 111 in AS1 101 from external router 112 in AS2 102. Compared to external routing information 710, updated routing information 730 specifies at least one updated route, such as route 733 to network 70.1.0.0/16 via next hop 310.0.0.1 instead of 200.0.0.1. Other routes 731-732 in updated routing information 730 are the same as those 711-712 in routing information 710.

At 650 and 660 in FIG. 6, in response to determination that a particular updated route to a particular network is invalid or bogus at a second instance of time (denoted as t1>t0), the updated route may be replaced with a valid (previously working) route. In practice, the detection at block 650 may be performed manually by a user (e.g., network administrator) and/or automatically by validation engine 170 based on any suitable criteria. For example, if a particular remote server from a different AS is not reachable, then an organization for its AS may refer to any suitable global routing monitoring systems to check whether the problem is because of rouge route advertisements. The validation may be manual or automated by checking the global routing monitoring systems. Additionally or alternatively, any suitable routing registries may be used to check for rouge route table entries. In practice, PLR-SR 111 may received multiple sets of updated routing information 730 before any invalid route is detected. Once detected, the correct routing information (i.e., valid at t0) may be advertised to other router(s).

Figure 7:
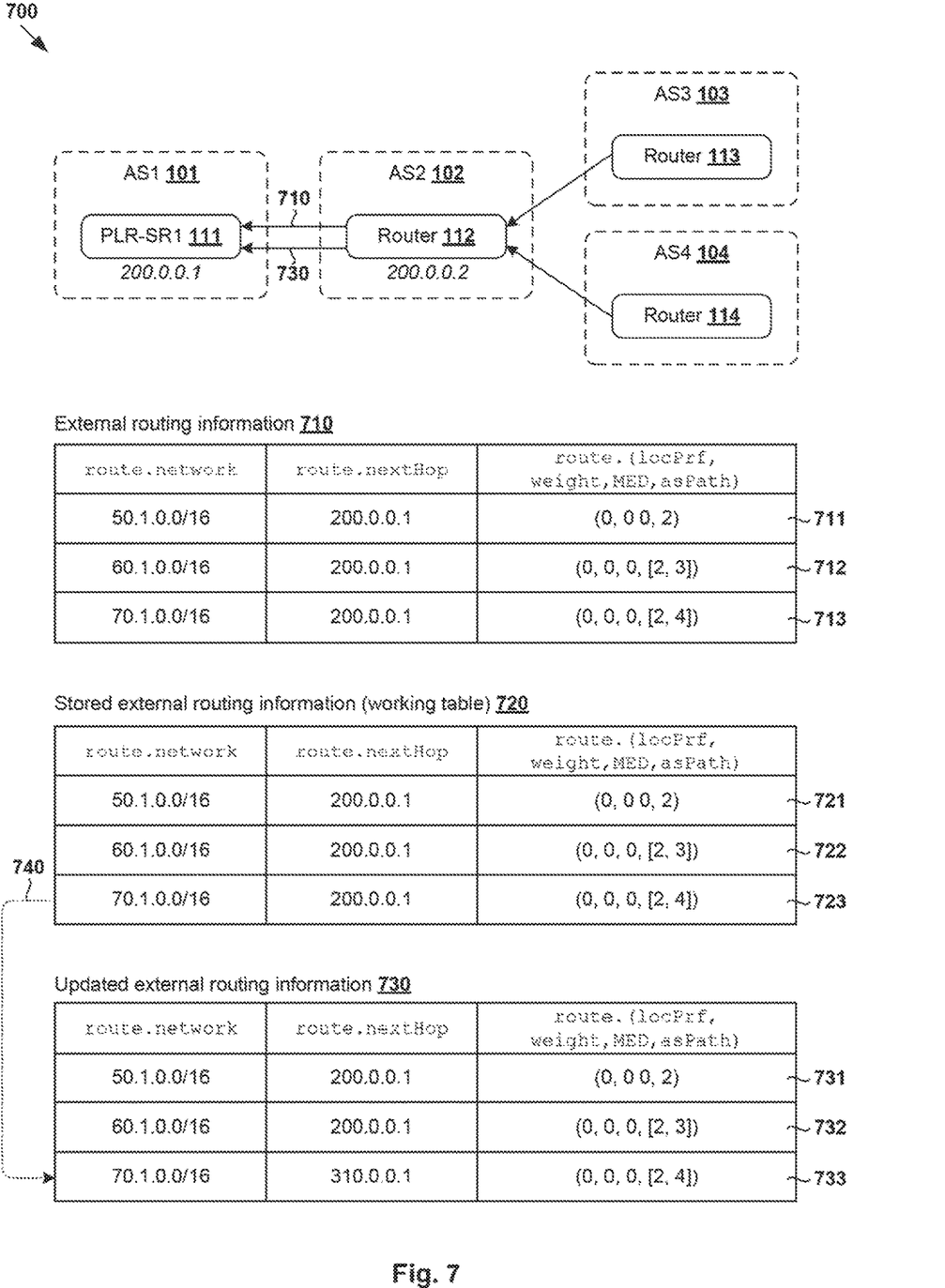
FIG. 7 is a schematic diagram illustrating example routing information at different instances of time.

In the example in FIG. 7, route 733 to network 70.1.0.0/16 via next hop 310.0.0.1 may be determined to be invalid at block 650, and replaced with corresponding route 723 retrieved from working table 720 (see also 740). This way, PLR-SR 111 may continue to forward egress traffic originating from VMs 151-156 to 70.1.0.0/16 via next hop=200.0.0.2. This may be used as a solution for convergence issues (i.e., time taken by BGP to learn all the routes). Similar to the examples in FIG. 4 and FIG. 5, validation engine 170 may also generate and send a security alert message to report invalid route 733 to a user (e.g., network administrator) through SDN manager 250 and/or SDN controller 260.

Container Implementation

Although described using VMs 151-156, examples of the present disclosures may be implemented for other data compute nodes, such as containers supported by VMs 151-156. Some examples will be described using FIG. 8, which is a schematic diagram illustrating example network topology information and example routing information associated with containers in SDN environment 100. In the example in FIG. 8, containers 801-806 may be executed as isolated processes inside respective VMs 151-156. As used herein, the term "container" or "container instance" may refer generally to an application that is encapsulated with all its dependencies (e.g., binaries, libraries, etc.).

Containers 801-806 are OS-less, meaning that they do not include any OS that could weigh 10s of Gigabytes (GB). This makes containers 801-806 more lightweight, portable, efficient and suitable for delivery into an isolated OS environment. Running containers inside a virtual machine (known as "containers-on-virtual-machine" approach) not only leverages the benefits of container technologies but also that of virtualization technologies. Similar to VMs 151-156, containers 801-806 are connected to logical switches 124-126 via respective logical ports 811-816 (see "LP-C1" to "LP-C6" in FIG. 8).

Figure 8:
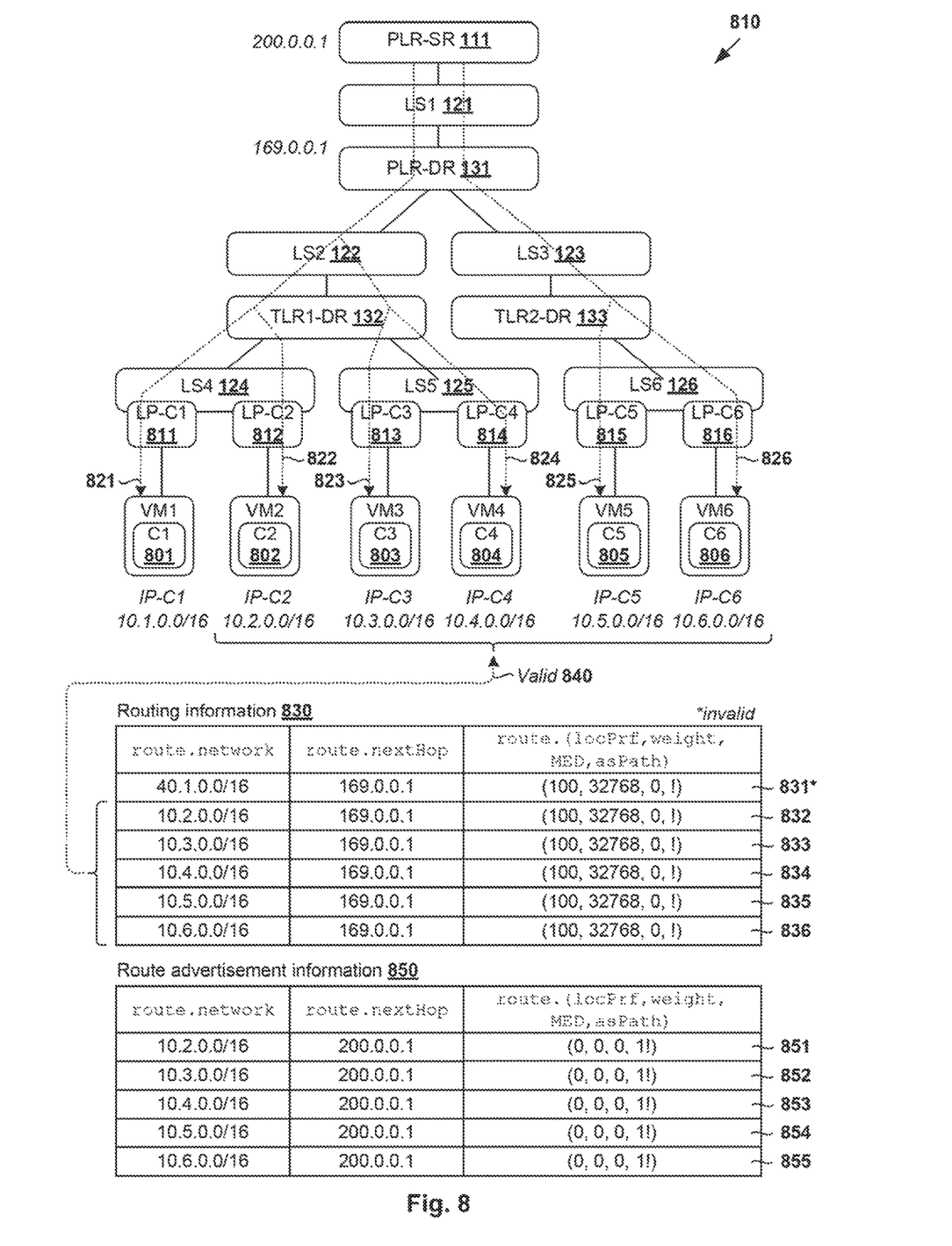
FIG. 8 is a schematic diagram illustrating example network topology information and example routing information associated with containers in an SDN environment.

In the example in FIG. 8, validation of routing information 830 may be performed based on network topology information 810 similar to the examples in FIG. 4. Routing information 830 specifies multiple first routes 831-836 to respective first networks 40.1.0.0/16 (see 831), 10.2.0.0/16 (see 832), 10.3.0.0/16 (see 833), 10.4.0.0/16 (see 834), 10.5.0.0/16 (see 835) and 10.6.0.0/16 (see 836) via next hop=169.0.0.1. Network topology information 810 specifies multiple second routes 821-826 connecting PLR-SR 111 with respective second networks 10.1.0.0/16 (see 821), 10.2.0.0/16 (see 822), 10.3.0.0/16 (see 823), 10.4.0.0/16 (see 824), 10.5.0.0/16 (see 825) and 10.6.0.0/16 (see 826) via PLR-DR 131.

According to blocks 435 to 475 in FIG. 4, validation engine 170 may determine that routes 832-836 are valid (see 840). However, route 831 in routing information 830 appears invalid because 40.1.0.0/16 cannot be found in network topology information 810. Further, route 821 in network topology information 810 cannot be found in routing information 830. According to blocks 480-485 in FIG. 4, validation engine 170 may configure PLR-SR 111 in AS1 101 to generate and send route advertisement information 850 to external router 112 in AS2 102. Route advertisement information 850 advertises valid routes 832-836 (see corresponding 851-855), but excludes invalid route 831. This way, the likelihood of propagating invalid routing information from AS1 101 to AS2 102, and subsequently to AS3 103 and AS4 104, may be reduced. Although not shown in FIG. 8, external routing information originating from AS2 102, AS3 103 and AS4 104 may be validated similar to the examples in FIG. 6 and FIG. 7.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of supporting validation engine 170 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to validate routing information in a software-defined networking (SDN) environment that includes a first autonomous system and a second autonomous system, the method comprising:
    obtaining routing information associated with a logical router in the first autonomous system, wherein the routing information specifies multiple first routes to respective multiple first networks, and wherein the multiple first routes specified in the routing information include a particular first route injected by a malicious hacker through prefix hijacking;
    obtaining network topology information associated with the first autonomous system, wherein the network topology information specifies currently deployed multiple second routes that connect the logical router to respective multiple second networks in which multiple virtualized computing instances are located in the first autonomous system;
    prior to configuring the logical router to generate any route advertisement information destined for the second autonomous system, validating the routing information based on the network topology information by determining whether attributes associated with the multiple first routes specified by the routing information match attributes associated with the multiple second routes specified by the network topology information; and
    in response to determination that the particular first route from amongst the multiple first routes is invalid due to a mismatch with the attributes associated with the multiple second routes, configuring the logical router to generate route advertisement information that conforms to the multiple second routes and that is destined for the second autonomous system, wherein the route advertisement information includes a subset of the multiple first routes that have attributes matching the attributes of the multiple second routes but excludes the invalid particular first route.

2. The method of claim 1, wherein validating the routing information comprises:
    determining whether a particular first network associated with the particular first route matches with one of the multiple second networks specified by the network topology information.

3. The method of claim 1, wherein validating the routing information comprises:
    determining whether the particular first route is valid based on one or more attributes associated with the particular first route that include: a next hop that connects the logical router to a particular first network associated with the particular first route, local preference information, weight information, multi exit discriminator (MED) information, and autonomous system (AS) path information.

4. The method of claim 1, wherein validating the routing information comprises:
    traversing a graph data structure that stores the network topology information which specifies how the logical router, being a service router, is connected to a particular first network, associated with the particular first route, via a distributed logical router and one or more logical switches.

5. The method of claim 1, wherein configuring the logical router comprises:
    generating and sending a notification message to the logical router to cause the logical router to exclude the particular first route from the route advertisement information which is destined for an external router in the second autonomous system.

6. The method of claim 1, further comprising:
    obtaining external routing information received by the logical router from an external router in the second autonomous system, wherein the external routing information specifies multiple third routes that connect the logical router to respective multiple third networks outside of the first autonomous system; and
    in response to determination that a particular third route from amongst the multiple third routes that connect the logical router to the respective multiple third networks is valid at a first instance of time, storing the particular third route which connects the logical router to a particular third network from amongst the multiple third networks.

7. The method of claim 6, further comprising:
obtaining updated external routing information that specifies an updated route to the particular third network; and
in response to determination that the updated route is invalid at a second instance of time, replacing the updated route with the stored third route that connects the logical router to the particular third network.

8. The method of claim 1, further comprising:
in response to determination that a particular second route from amongst the multiple second routes specified by the network topology information is absent from the routing information, identifying a denial of service attack directed at a particular second network, from amongst the multiple second networks, associated with the particular second route.

9. A non-transitory computer-readable storage medium that includes a set of instructions which, in response to execution by a processor of a computer system, cause the processor to perform a method of routing information validation in a software-defined networking (SDN) environment that includes a first autonomous system and a second autonomous system, wherein the method comprises:
obtaining routing information associated with a logical router in the first autonomous system, wherein the routing information specifies multiple first routes to respective multiple first networks, and wherein the multiple first routes specified in the routing information include a particular first route injected by a malicious hacker through prefix hijacking;
obtaining network topology information associated with the first autonomous system, wherein the network topology information specifies currently deployed multiple second routes that connect the logical router to respective multiple second networks in which multiple virtualized computing instances are located in the first autonomous system;
prior to configuring the logical router to generate any route advertisement information destined for the second autonomous system, validating the routing information based on the network topology information by determining whether attributes associated with the multiple first routes match attributes associated with the multiple second routes specified by the network topology information; and
in response to determination that the particular first route from amongst the multiple first routes is invalid due to a mismatch with the attributes associated with the multiple second routes, configuring the logical router to generate route advertisement information that conforms to the multiple second routes and that is destined for the second autonomous system, wherein the route advertisement information includes a subset of the multiple first routes but excludes the invalid particular first route.

10. The non-transitory computer-readable storage medium of claim 9, wherein validating the routing information comprises:
determining whether a particular first network associated with the particular first route matches with one of the multiple second networks specified by the network topology information.

11. The non-transitory computer-readable storage medium of claim 9, wherein validating the routing information comprises:
determining whether the particular first route is valid based on one or more attributes associated with the particular first route that include: a next hop that connects the logical router to a particular first network associated with the particular first route, local preference information, weight information, multi exit discriminator (MED) information, and autonomous system (AS) path information.

12. The non-transitory computer-readable storage medium of claim 9, wherein validating the routing information comprises:
traversing a graph data structure that stores the network topology information which specifies how the logical router, being a service router, is connected to a particular first network, associated with the particular first route, via a distributed logical router and one or more logical switches.

13. The non-transitory computer-readable storage medium of claim 9, wherein configuring the logical router comprises:
generating and sending a notification message to the logical router to cause the logical router to exclude the particular first route from the route advertisement information which is destined for an external router in the second autonomous system.

14. The non-transitory computer-readable storage medium of claim 9, wherein the method further comprises:
obtaining external routing information received by the logical router from an external router in the second autonomous system, wherein the external routing information specifies multiple third routes that connect the logical router to respective multiple third networks outside of the first autonomous system; and
in response to determination that a particular third route from amongst the multiple third routes that connect the logical router to the respective multiple third networks is valid at a first instance of time, storing the particular third route which connects the logical router to a particular third network from amongst the multiple third networks.

15. The non-transitory computer-readable storage medium of claim 14, wherein the method further comprises:
obtaining updated external routing information that specifies an updated route to the particular third network; and
in response to determination that the updated route is invalid at a second instance of time, replacing the updated route with the stored third route that connects the logical router to the particular third network.

16. The non-transitory computer-readable storage medium of claim 9, wherein the method further comprises:
in response to determination that a particular second route from amongst the multiple second routes specified by the network topology information is absent from the routing information, identifying a denial of service attack directed at a particular second network, from amongst the multiple second networks, associated with the particular second route.

17. A computer system configured to perform routing information validation in a software-defined networking (SDN) environment that includes a first autonomous system and a second autonomous system, the computer system comprising:
a processor; and
a non-transitory computer-readable medium having stored thereon instructions that, in response to execution by the processor, cause the processor to perform:
obtain routing information associated with a logical router in the first autonomous system, wherein the routing information specifies multiple first routes to respective multiple first networks, and wherein the multiple first routes specified in the routing information include a particular first route injected by a malicious hacker through prefix hijacking;

obtain network topology information associated with the first autonomous system, wherein the network topology information specifies currently deployed multiple second routes that connect the logical router to respective multiple second networks in which multiple virtualized computing instances are located in the first autonomous system;

prior to configuring the logical router to generate any route advertisement information destined for the second autonomous system, validate the routing information based on the network topology information by determination whether attributes associated with the multiple first routes specified by the routing information match attributes associated with the multiple second routes specified by the network topology information; and in response to determination that the particular first route from amongst the multiple first routes is invalid due to a mismatch with the attributes associated with the multiple second routes, configure the logical router to generate route advertisement information that conforms to the multiple second routes and that is destined for the second autonomous system, wherein the route advertisement information includes a subset of the multiple first routes that have attributes matching the attributes of the multiple second routes but excludes the invalid particular first route.

18. The computer system of claim 17, wherein the instructions that cause the processor to validate the routing information cause the processor to:

determine whether a particular first network associated with the particular first route matches with one of the multiple second networks specified by the network topology information.

19. The computer system of claim 17, wherein the instructions that cause the processor to validate the routing information cause the processor to:

determine whether the particular first route is valid based on one or more attributes associated with the particular first route that include: a next hop that connects the logical router to a particular first network associated with the particular first route, local preference information, weight information, multi exit discriminator (MED) information, and autonomous system (AS) path information.

20. The computer system of claim 17, wherein the instructions that cause the processor to validate the routing information cause the processor to:

traverse a graph data structure that stores the network topology information which specifies how the logical router, being a service router, is connected to a particular first network, associated with the particular first route, via a distributed logical router and one or more logical switches.

21. The computer system of claim 17, wherein the instructions that cause the processor to configure the logical router cause the processor to:

generate and send a notification message to the logical router to cause the logical router to exclude the particular first route from the route advertisement information which is destined for an external router in the second autonomous system.

22. The computer system of claim 17, wherein the instructions further cause the processor to:

obtain external routing information received by the logical router from an external router in the second autonomous system, wherein the external routing information specifies multiple third routes that connect the logical router to respective multiple third networks outside of the first autonomous system; and in response to determination that a particular third route from amongst the multiple third routes that connect the logical router to the respective multiple third networks is valid at a first instance of time, store the particular third route which connects the logical router to a particular third network from amongst the multiple third networks.

23. The computer system of claim 22, wherein the instructions further cause the processor to:

obtain updated external routing information that specifies an updated route to the particular third network; and in response to determination that the updated route is invalid at a second instance of time, replace the updated route with the stored third route that connects the logical router to the particular third network.

24. The computer system of claim 17, wherein the instructions further cause the processor to:

in response to determination that a particular second route from amongst the multiple second routes specified by the network topology information is absent from the routing information, identify a denial of service attack directed at a particular second network, from amongst the multiple second networks, associated with the particular second route.

\* \* \* \* \*